July 27, 1954     F. X. LAMB     2,684,862

COVER SECURING MEANS FOR INSTRUMENT HOUSINGS

Filed May 22, 1950

FRANCIS X. LAMB
INVENTOR.

BY Rudolph J. Jurick

ATTORNEY

Patented July 27, 1954

2,684,862

UNITED STATES PATENT OFFICE 2,684,862

COVER SECURING MEANS FOR INSTRUMENT HOUSINGS

Francis X. Lamb, East Orange, N. J., assignor to Weston Electrical Instrument Corporation, Newark, N. J., a corporation of New Jersey Application May 22, 1950, Serial No. 163,367

1 Claim. (Cl. 292—3)

This invention relates to an instrument housing, or the like, comprising a case removably secured to a base by screws and more particularly to a novel arrangement for fastening the case to the base when the case is made of a frangible material subject to cracking when placed under strain.

The invention will be described with specific reference to a housing for electrical indicating instruments but it will be apparent the novel features of my construction are not limited to such specific application.

An electrical instrument housing usually comprises a relatively flat base, supporting the instrument mechanism, and a case, the latter having a transparent front, or window, through which the indication of a pointer relative to a suitable scale may be observed. In the case of a round instrument the base is, essentially, a round disc and the case includes a cylindrical barrel that circumscribes the base and is secured thereto by fastening screws. For reasons of production economy and to facilitate assembly, the inside diameter of the barrel is somewhat larger than that of the base. Therefore, the screws are relied upon to hold the two parts together securely and, consequently, the screws exert considerable pressure against the contacted surface of the case. When the two parts are made of tough, durable material such as a thermo-setting plastic considerable pressure may be exerted by the fastening screws without damage to the relatively thin-walled barrel of the case. When, however, the case is made of a transparent, thermo-plastic material, even relatively low tension and/or compression strains result in a cracking of the case in the region of the screw holes, as such materials are frangible. One piece, transparent cases are desirable for modern instrument design yet one of the main reasons why the use of such material for this purpose has not been general is because of the difficulty just mentioned.

An object of this invention is the provision of an improved arrangement for fastening a case to a base to form a closed housing.

An object of this invention is the provision of an improved arrangement for fastening a case to a base by screws to form a closed housing and in which the pressure exerted by the fastening screws is radial with respect to the hole in the case through which the screw passes.

An object of this invention is the provision of a housing for electrical instruments, or the like, comprising a base, a case, fastening screws passing through the case into the base, and pressure-deformable members preventing direct contact between the fastening screws and the case.

An object of this invention is the provision of a housing comprising a base having a plurality of threaded holes therein, a case having an open end adapted to circumscribe the base and including transverse holes alinable with the holes in the base, a washer of deformable but relatively non-compressible material in each of the case holes and screws passing through the washers and into the threaded holes in the base.

An object of this invention is the provision of a housing for instruments, or the like, and comprising; a circular base having a plurality of radially-extending, threaded holes therein; a cylindrical case having an end adapted to circumscribe the base loosely; radial holes in the case alined with the holes in said base; a washer of deformable but relatively non-compressible material disposed in each hole in the case; and individual screws passing through the washers and into the threaded holes in the base; said screws providing sufficient pressure to cause the associated washer to conform to the contour of the hole and a portion of the washer to expand into the clearance area between the case and base.

These and other objects and advantages of the invention will become apparent from the following description when taken with the accompanying drawings. The drawings are for purposes of illustration and should not be construed as defining the scope or limits of the invention, reference being had for the latter purpose to the appended claim.

In the drawings wherein like reference characters denote like parts in the several views.

Figure 1:
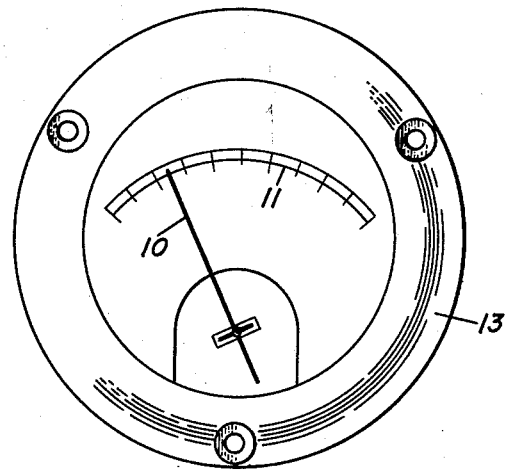
Figure 1 is a front view of a round, electrical instrument.
Figure 2:
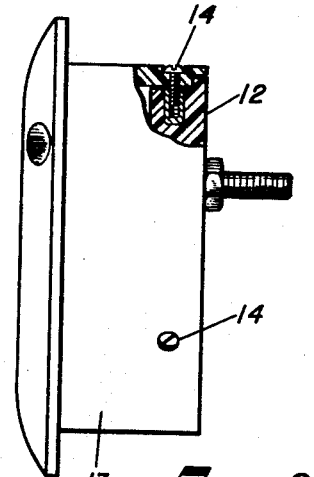
Figure 2 is a side view of the instrument with a section of the case broken away at the point where the case is fastened to the base.

Referring now to Figures 1 and 2, one type of electrical indicating instrument comprises a mechanism responsive to an electrical factor such as volts, amperes, watts, etc., the value of which is indicated by a pointer 10 associated with a suitably calibrated scale. The housing of the instrument comprises a base 12 that carries the internal mechanism, not shown, and a case 13 that is secured to the base by screws 14. Usually three such fastening screws are employed, spaced apart 120 angular degrees, each screw being threaded into the base.

Figure 3:
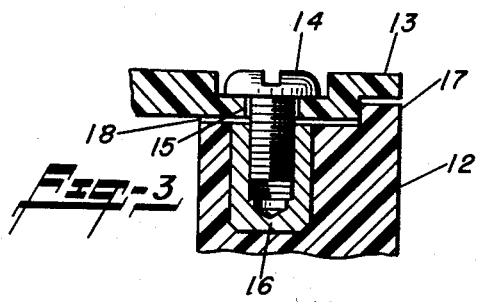
Figure 3 is a view of the cross-sectioned portion of Figure 2, drawn to an enlarged scale, and showing a conventional arrangement for fastening the case to the base.

Figure 3, which is an enlarged view of the cross-sectioned portion of Figure 2, shows one conventional method of securing the case to the base. The screw 14 (and others like it) passes through a hole 15 in the case 13, said hole having a counterbore whereby the screw head will lie flush with, or below, the outer surface of the case. As shown in the drawings, the cooperating member carried by the base comprises a metal threaded insert 16 molded directly into the base. Such insert provides a good, permanent mechanical anchorage for the cooperating screw but a simple drilled and tapped hole will suffice in most applications of this character. It will be noted that the base 12 has an integral flange 17 of enlarged diameter and the end of the case 13 includes a circumferential recess corresponding thereto. Such construction provides a fairly dust-tight housing. Also, to facilitate the assembly of the two parts, the case is somewhat larger than the base resulting in a clearance area 18 therebetween.

When the case is made of a tough, durable material the conventional fastening arrangement, Figure 3, is satisfactory as screws 14 may be threaded into the base to provide considerable lateral pressure against the case without danger of damage due to mechanical strain. However, when the case is made of an acrylic resin such as "Lucite" a transparent plastic, the illustrated construction is unsatisfactory as even relatively low pressure exerted by the fastening screws results in a cracking of the material in the region of the holes in the case.

Figure 4:
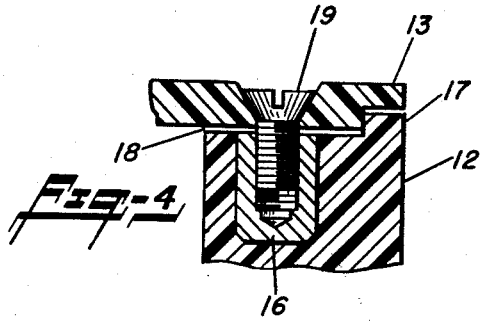
Figure 4 is a view similar to that of Figure 3 but showing another conventional arrangement for fastening the case to the base.

Figure 4 illustrates another conventional fastening arrangement wherein the radial holes in the case are tapered and the screws 19 have correspondingly tapered heads. While such arrangement is satisfactory for use with a case made of tough, durable material, it likewise, is not satisfactory for use with the relatively frangible, thermo-plastic materials, for reasons already mentioned.

In the conventional arrangements illustrated in Figures 3 and 4, the pressure exerted by the fastening screw is entirely or substantially axial relative to the screw, that is, normal to the thickness of the case barrel. Inasmuch as the thickness of the barrel is usually less than $\frac{1}{10}$ of an inch it will be apparent the material must be durable to withstand the pressure of the screw head when the screws are tightened sufficiently to hold the case securely to the base. The thermo-plastic materials do not possess the requisite degree of durability in this respect, yet thermo-plastic cases are pleasing in appearance. Further, such cases may be made entirely transparent in which event the case may be molded as a single, complete unit thereby eliminating the need for a separate glass window to permit viewing the scale and pointer.

Figure 5:
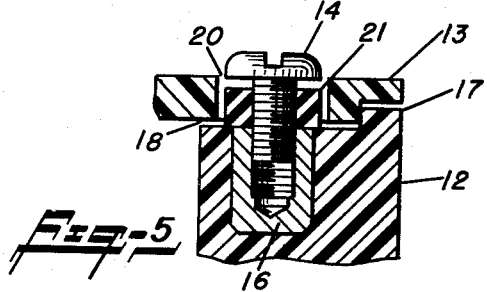
Figure 5 is also similar to Figure 3 but illustrating my novel fastening arrangement that includes a pressure-deformable member disposed within the hole in the case.
Figure 6:
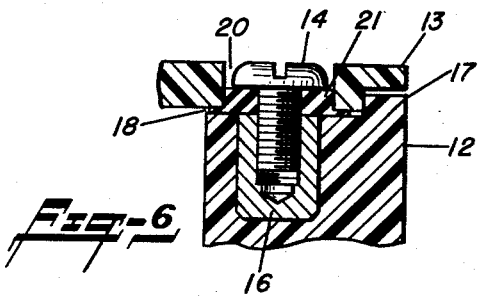
Figure 6 illustrates the expansion of the deformable member into the clearance area between the case and base under the pressure exerted by the head of the fastening screw.

Figures 5 and 6 illustrate my novel fastening arrangement whereby a frangible case may be fastened to the base securely and without danger of cracking either during the assembly operation or at a later time under relative expansion or contraction of the parts with temperature changes. It will be noted that in my construction the holes 20 in the case 13 are of uniform diameter thereby simplifying the drilling operation. Alternatively, these holes may be formed during the case molding operation. Disposed loosely within each of the case holes 20 is a washer 21 made of deformable material such as rubber, cork, vinylite plastic, or etc. The fastening screws 14 pass through the washers 21 and into the associated inserts 16 (see Figure 5). Upon threading the screw into the insert the screw head exerts a pressure against the washer causing a deformation thereof in conformity with the contour of the hole. Additional pressure applied through the screw head causes the inner end of the washer to expand into the clearance area 18 between the case and base, as shown in Figure 6, thereby providing seats which position the case circumferentially with respect to the base in a satisfactory manner.

It will now be apparent that in my fastening arrangement there is no direct contact between the screws and the case, thereby reducing, substantially, the possibility of cracking of the case material due to mechanical shock. Further, the deformable washers eliminate high spots of tensive or compressive strain since the washers follow the contour of the hole thereby resulting in a uniform distribution of the pressure in a direction radial to the hole. The latter point is important as the radial pressure of the washer is exerted in the direction in which the case has maximum mechanical strength. Also, any relative expansion between the case and base will not result in undue strain on either part as the disclosed arrangement will permit slight relative movement between the case and base through the medium of the deformable, resilient washers.

While I have indicated various materials, having a deformation characteristic, as satisfactory for the washers, rubber washers are preferred as such material is deformable yet relatively non-compressible.

Although the described invention is particularly adapted for use with a case made of frangible material it can, obviously, be used with a case made of conventional durable material. In such instance, while there is not the danger of cracking due to strain, the expansion of the deformable washers into the clearance area between the case and base provides a mechanically superior arrangement.

Having now described my invention certain variations in the size, shape and relative arrangement of the parts will suggest themselves to those skilled in this art. Such variations may be made without departing from the spirit and scope of the invention as set forth in the following claim.

I claim:

An improved arrangement for securing a plastic material cup-shaped instrument cover to a circular base which base has a diameter that is significantly less than the inside diameter of the cover wall thereby resulting in a clearance area between the peripheral surface of the base and the cover wall when the cover is positioned over the base; said arrangement comprising a plurality of washers of pressure-deformable material disposed within uniform-diameter radial holes formed in the cover wall, said holes being substantially uniformly spaced around the cover wall and each of said washers having an inner end abutting the peripheral surface of the base and an outer end lying below the outer surface of the cover wall; and screws passing through each washer and having heads disposed entirely within the associated hole, said screws being threaded into alined radial holes formed in the base such that the pressure of the screw head against the washer is sufficient to expand the inner end of the washer into the clearance area between the cover and the base.

References Cited in the file of this patent

UNITED STATES PATENTS

| Number | Name | Date |
|---|---|---|
| 1,751,483 | Lemont | Mar. 25, 1930 |
| 2,130,863 | Stickney et al. | Sept. 20, 1938 |
| 2,159,346 | Welch et al. | May 23, 1939 |
| 2,236,736 | Scott | Apr. 1, 1941 |
| 2,277,885 | Rodanet | Mar. 31, 1942 |
| 2,319,504 | Holman | May 18, 1943 |
| 2,372,939 | Elliott | Apr. 3, 1945 |
| 2,420,184 | Mekelburg | May 6, 1947 |
| 2,426,800 | Triplett | Sept. 2, 1947 |
| 2,520,375 | Roe | Aug. 29, 1950 |
| 2,532,599 | Bourquin | Dec. 5, 1950 |

FOREIGN PATENTS

| Number | Country | Date |
|---|---|---|
| 270,928 | Great Britain | May 19, 1927 |
| 680,587 | Germany | Aug. 10, 1939 |